Sept. 9, 1969      P. W. GULL      3,465,758

EAR CORN SAMPLER

Filed April 21, 1966      2 Sheets-Sheet 1

INVENTOR.
Proctor W. Gull

BY    Carl A. Cline
AGENT

United States Patent Office 3,465,758
Patented Sept. 9, 1969

3,465,758
EAR CORN SAMPLER
Proctor W. Gull, Kansas City, Mo., assignor to Gulf Research & Development Company, Pittsburgh, Pa., a corporation of Delaware
Filed Apr. 21, 1966, Ser. No. 544,273
Int. Cl. A01f 11/06; A47j 17/02
U.S. Cl. 130—9                3 Claims

ABSTRACT OF THE DISCLOSURE

A power-driven ear corn sampler which is safe to operate and consistently yields representative samples drives ears of corn downward through a tubular passage by means of a chain conveyor, one or two rows of kernels being stripped from the ear by a projection on the wall of the tubular passage as the ear passes through, the stripped kernels being conducted to a sample container and the ears dropping from the bottom of the tubular passage after sampling.

Description of invention

When conducting research in connection with the growing of corn as a crop, it frequently becomes necessary to obtain a small, representative sample of grain from a test plot or field of corn. One or two ears of corn do not constitute a representative sample and it is seldom feasible to obtain a representative sample from the bin of a corn picking machine. It has been found, however, that a sample consisting of one or two rows of kernels from a number of ears chosen at random is statistically representative of the entire quantity. A simple, hand-operated device has been used in the past for stripping out two rows of kernels from each ear of corn chosen for sampling. The hand operated device, however, is fatiguing in use and is unsafe in the hands of a tired operator.

This invention, briefly, is a power-driven ear corn sampler in which a conveyor pushes ears of corn past a projection in the interior wall of the device, removing a few rows of kernels as each ear passes through.

Figure 1:
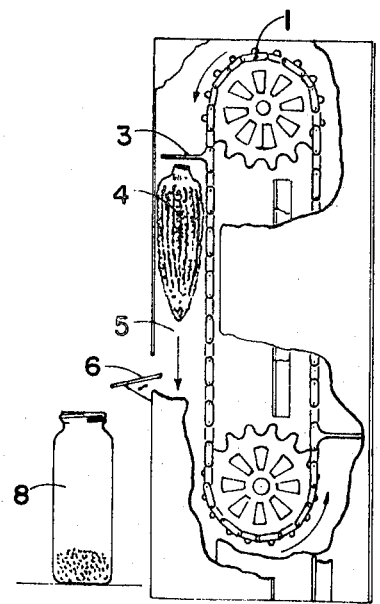
Figure 2:
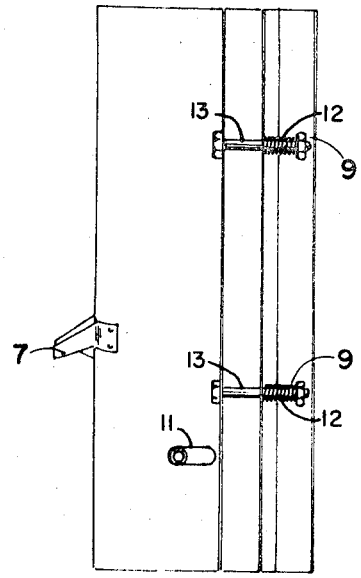
Figure 3:
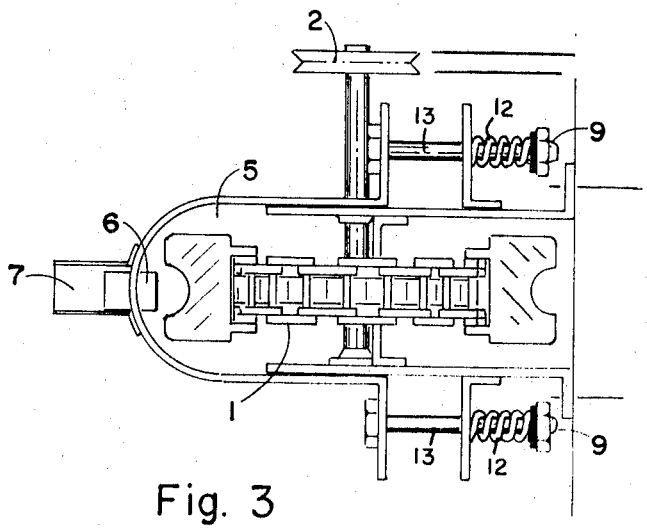
Figure 4:
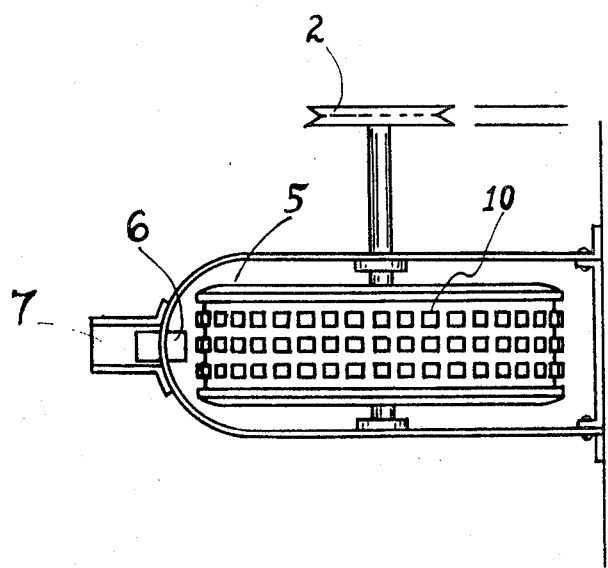

By reference to the drawing illustrating a specific embodiment of the invention, the construction and operation of the device will be readily understood. FIGURE 1 is a cutaway view of the specifically exemplified device, mounted so that ears of corn pass downward vertically through a tubular passage as indicated by arrows. FIGURE 2 is a side view and FIGURE 3 is an exterior view looking downward through the passage through which the corn is pushed. FIGURE 4 is an exterior view, looking downward through the embodiment which employs a pneumatic tire as both conveyor and resilient means.

The endless, flexible member 1, which is illustrated as a conveyor chain in the specific embodiment of FIGURES 1-3 is driven, for example, by a flexible drive, as through V-belt pulley 2. A projection 3 carried on the endless, flexible member pushes the ear of corn 4 downward through the tubular passage 5 past the projection in the wall 6 which is so arranged that it dislodges about two rows of kernels of corn as the ear is pushed through the tubular passage. The dislodged kernels are conducted through an opening in the wall and down the chute 7 into the sample container 8. So as to maintain a close-fitting relationship between the power-driven, flexible member and the wall of the tubular passage when the ear is driven past the kernel-dislodging projection, resilient means 9 is provided for maintaining the close-fitting relationship. The resilient means 9 illustrated in the drawing in FIGURES 2 and 3 consists of springs 12 at one end of each of the bolts 13 by which the tubular wall is attached to the rest of the apparatus, urging the wall against the flexible conveyor chain. Slots 11 are cut in the wall of the tubular housing where the sprocket driveshaft passes through the apparatus, as may be seen in FIGURE 2, thus permitting independent movement in the housing in response to pressure exerted by the passage of ears of corn through the apparatus and the force exerted by the resilient means in the opposing direction.

In constructing the sampling device it should be kept in mind that the purpose of the apparatus is to obtain whole kernels of corn. It is therefore not advisable to sharpen the projection which dislodges the kernels, since a sharpened edge might cut off the tops of the kernels rather than dislodge them from the ear. The close fitting relationship between the ear of corn and the wall of the passage is also desirable for the same reason, since an ear of corn which passes through loosely may have the tops of some of the kernels broken off, yielding fragments which make the sample non-representative. Other means may be employed for maintaining the close fitting relationship of the ear as it is pushed through the tubular passage. For example, the endless flexible member may be in the form of an inflated tube, such as a rubber tire, as illustrated in FIGURE 4, in which pneumatic tire 10 mounted on a wheel serves both as a power-driven flexible member to drive ears of corn through the tubular passage by means of the projections of the tire tread and also contains the resilient means to obtain the close fit between the ear of corn and the opposite wall of the passage.

After the ears of corn have passed through the sampler, they may be caught in a container below or conducted directly to a sheller to recover the balance of the grain. It has been found convenient in actual practice to mount the sampler on a corn picking machine with a holder for a sample bottle attached to the sampler to hold the bottle in the position shown in FIGURE 1. A power takeoff and a V-belt drive are employed to operate the sampler and after sampling, the sampled ears are fed into the machine, where the rest of the grain is recovered.

Heavy gauge steel has been found satisfactory for the housing of the device. The interior wall of the tubular passage is preferably smooth, to reduce friction when ears of corn pass through.

No difficulty has been experienced from variation in size of ears of commercial varieties of corn, since present farming practices yield ears of corn which are quite uniform in size, most of them being very close to one-half pound in weight and very nearly the same diameter.

Power requirements for operation of the sampler are moderate, so that the apparatus may be conveniently operated in the laboratory with a fractional horsepower electric motor. Sealed antifriction bearings are preferred for the sprocket shafts, both to reduce power requirements and to keep dust out of the bearing surfaces.

The conveyor chain employed in the specifically exemplified apparatus is of conventional construction, the links being made of malleable iron or mild steel. Molded nylon conveyor chain can also be used, if desired. The type of chain employed is not critical, since the chain moves at low speed (less than one foot per second), thus avoiding tensile stresses which would be generated in high speed operation. Because of the low operating speed, sprocket-generated vibration is of such low frequency and amplitude that it does not present a problem, so that inexpensive cast iron sprockets perform satisfactorily. The sprockets and conveyor chain may occasionally crack, deform or dislodge a few grains from an ear of corn but this does not affect the sample, since these grains are on the opposite side of the ear from the sample and pass out the bottom of the apparatus.

The apparatus consistently yields representative samples of grain and may be operated with safety. The normal operating procedure is to drop one ear in the top immediately after an ear falls out the bottom of the tubular passage. It is not necessary to ever have the hands in a position in which they will come in contact with moving parts of the apparatus. If a mistake is made in dropping an ear into the machine at a time when one of the pushers on the conveyor is in the way, the resilient mounting of the housing of the tubular passage will compensate for the error.

What is claimed is:

1. An ear corn sampler comprising the combination of:
   (a) a power-driven, endless, flexible member which travels longitudinally along one wall of a tubular passage;
   (b) a projecting structure carried on said endless, flexible member which is positioned so as to push an ear of corn through the tubular passage;
   (c) a projection on the interior wall of the tubular passage opposite to said endless, flexible member so arranged as to dislodge at least one row of kernels from the ear of corn as the ear is pushed through the tubular passage;
   (d) resilient means for urging the endless, flexible member toward the opposite wall of the tubular passage so as to maintain a close-fitting relationship between the opposite wall and the ear of corn as the ear is pushed past the projection on the interior wall of the tubular passage; and
   (e) a means for conducting the dislodged kernels of corn into a container.

2. An ear corn sampler comprising the combination of:
   (a) a power-driven conveyor chain which travels downward vertically along one side of a tubular passage;
   (b) a projecting structure carried on the conveyor chain which is positioned so as to push an ear of corn downward through the tubular passage;
   (c) a projection on the interior wall of the tubular passage opposite the conveyor chain so arranged as to dislodge two rows of kernels from the ear of corn as the ear is pushed through the tubular passage;
   (d) a moveable, spring-loaded mounting means attached to the housing of the tubular passage which urges the conveyor chain and the opposite wall of the tubular passage toward each other so as to maintain a close-fitting relationship between the opposite wall and the ear of corn as the ear is pushed past the projection on the interior wall of the tubular passage; and
   (e) an opening in the wall of the tubular passage immediately above the projection on the interior wall and a guide chute adjacent thereto, through which the dislodged kernels of corn are conducted into a container.

3. An ear corn sampler comprising the combination of:
   (a) a power-driven pneumatic-tired wheel, the periphery of which travels downward vertically along one side of a tubular passage;
   (b) projections on the periphery of the pneumatic tire which are positioned so as to drive an ear of corn downward through the tubular passage;
   (c) a projection on the interior wall of the tubular passage opposite the pneumatic tire so arranged as to dislodge two rows of kernels from the ear of corn as the ear is driven through the tubular passage;
   (d) an opening in the wall of the tubular passage immediately above the projection on the interior wall and a guide chute adjacent thereto, through which the dislodged kernels of corn are conducted into a container.

References Cited
UNITED STATES PATENTS

| | | | |
|---|---|---|---|
| 975,631 | 11/1910 | Morrall et al. | 130—9.1 |
| 1,276,328 | 8/1918 | Clark | 130—10 |
| 1,465,525 | 8/1923 | Morrall et al. | 130—9.1 |
| 2,282,660 | 5/1942 | Lee | 130—10 XR |

ANTONIO F. GUIDA, Primary Examiner

U.S. Cl. X.R.

146—4